(12) United States Patent
Matz et al.

(10) Patent No.: US 7,020,652 B2
(45) Date of Patent: Mar. 28, 2006

(54) SYSTEM AND METHOD FOR CUSTOMIZING CONTENT-ACCESS LISTS

(75) Inventors: William R. Matz, Atlanta, GA (US); Scott R. Swix, Duluth, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 453 days.

(21) Appl. No.: 10/036,923

(22) Filed: Dec. 21, 2001

(65) Prior Publication Data

US 2003/0130979 A1    Jul. 10, 2003

(51) Int. Cl.
*G06F 17/30* (2006.01)

(52) U.S. Cl. ................................ 707/7; 725/9
(58) Field of Classification Search ............ 707/1, 707/3, 100, 102; 725/9, 32, 37, 86
See application file for complete search history.

(56) References Cited

U.S. PATENT DOCUMENTS

| | | |
|---|---|---|
| 677,209 A | 6/1901 | Chernock et al. |
| 3,798,610 A | 3/1974 | Bliss et al. |
| 3,886,302 A | 5/1975 | Kosco |
| 4,130,833 A | 12/1978 | Chomet |
| 4,258,386 A | 3/1981 | Cheung |
| 4,361,851 A | 11/1982 | Asip et al. |
| 4,488,179 A | 12/1984 | Kruger et al. |
| 4,566,030 A | 1/1986 | Nickerson et al. |
| 4,567,591 A | 1/1986 | Gray et al. |
| 4,598,288 A | 7/1986 | Yarbrough et al. |
| 4,602,279 A | 7/1986 | Freeman |
| 4,688,248 A | 8/1987 | Tomizawa |
| 4,689,661 A | 8/1987 | Barbieri et al. |
| 4,697,209 A | 9/1987 | Kiewitt et al. |
| 4,698,670 A | 10/1987 | Matty |
| 4,720,873 A | 1/1988 | Goodman et al. |
| 4,816,904 A | 3/1989 | McKenna et al. |
| 4,890,322 A | 12/1989 | Russell, Jr. |
| 4,912,552 A | 3/1990 | Allison, III et al. |
| 5,010,585 A | 4/1991 | Garcia |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,173,900 A | 12/1992 | Miller et al. |
| 5,191,645 A | 3/1993 | Carlucci et al. |
| 5,208,665 A | 5/1993 | McCalley et al. |
| 5,247,347 A | 9/1993 | Litteral et al. |

(Continued)

FOREIGN PATENT DOCUMENTS

EP    0 424 648 A    2/1991

(Continued)

OTHER PUBLICATIONS

U.S. Appl. No. 10/016,988, filed Dec. 14, 2001, Matz.

(Continued)

*Primary Examiner*—Uyen Le

(57) ABSTRACT

Systems and methods for customizing the presentation of a content-access list based on subscriber-specific information, such as historic viewing preferences and related information are described. An embodiment of the present invention includes a content-access-history database, a content database, and an option list creator, which combines data in the content-access-history and content databases to create lists of content-access options that are customized for individual subscribers. In one embodiment, a subscribers television viewing patterns and related behaviors are analyzed and the options in an electronic program guide (EPG) are filtered and sorted based on the results of the analysis.

20 Claims, 4 Drawing Sheets

U.S. PATENT DOCUMENTS

| | | |
|---|---|---|
| 5,249,044 A | 9/1993 | VonKohorn |
| 5,251,324 A | 10/1993 | McMullan |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,389,964 A | 2/1995 | Oberle |
| 5,404,393 A | 4/1995 | Remillard |
| 5,410,326 A | 4/1995 | Goldstein |
| 5,410,344 A | 4/1995 | Graves |
| 5,446,490 A | 8/1995 | Blahut et al. |
| 5,446,919 A | 8/1995 | Wilkins |
| 5,500,681 A | 3/1996 | Jones |
| 5,534,911 A | 7/1996 | Levitan |
| 5,559,548 A | 9/1996 | Davis et al. |
| 5,585,838 A | 12/1996 | Lawler et al. |
| 5,585,865 A | 12/1996 | Amano |
| 5,600,364 A | 2/1997 | Hendricks |
| 5,608,448 A | 3/1997 | Smoral et al. |
| 5,619,247 A | 4/1997 | Russo |
| 5,630,119 A | 5/1997 | Aristides et al. |
| 5,661,516 A | 8/1997 | Carles |
| 5,724,521 A | 3/1998 | Dedrick |
| 5,724,525 A | 3/1998 | Beyers, II et al. |
| 5,752,159 A | 5/1998 | Faust et al. |
| 5,754,398 A | 5/1998 | Herz |
| 5,754,938 A | 5/1998 | Herz |
| 5,758,257 A | 5/1998 | Herz |
| 5,758,259 A | 5/1998 | Lawler |
| 5,774,170 A | 6/1998 | Hite et al. |
| 5,778,182 A | 7/1998 | Cathey et al. |
| 5,794,210 A | 8/1998 | Goldhaber et al. |
| 5,818,438 A | 10/1998 | Howe |
| 5,838,314 A | 11/1998 | Neel |
| 5,848,396 A | 12/1998 | Gerace |
| 5,861,906 A | 1/1999 | Dunn |
| 5,892,508 A | 4/1999 | Howe |
| 5,892,536 A | 4/1999 | Logan |
| 5,917,481 A | 6/1999 | Rzeszewski et al. |
| 5,948,061 A | 9/1999 | Merriman et al. |
| 5,973,683 A | 10/1999 | Cragun |
| 5,983,227 A | 11/1999 | Nazem et al. |
| 6,002,393 A | 12/1999 | Hite |
| 6,005,597 A | 12/1999 | Barrett |
| 6,015,344 A | 1/2000 | Kelly et al. |
| 6,029,045 A | 2/2000 | Picco et al. |
| 6,076,094 A | 6/2000 | Cohen |
| 6,100,916 A | 8/2000 | August |
| 6,119,098 A | 9/2000 | Guyot et al. |
| 6,134,531 A | 10/2000 | Trewitt et al. |
| 6,172,674 B1 | 1/2001 | Etheridge |
| 6,185,614 B1 | 2/2001 | Cuomo |
| 6,202,210 B1 | 3/2001 | Ludtke |
| 6,252,586 B1 | 6/2001 | Freeman et al. |
| 6,282,713 B1 | 8/2001 | Kitsukawa |
| 6,314,568 B1 | 11/2001 | Ochiai |
| 6,314,577 B1 | 11/2001 | Pocock |
| 6,327,574 B1 | 12/2001 | Kramer et al. |
| 6,345,256 B1 | 2/2002 | Milsted et al. |
| 6,408,437 B1 * | 6/2002 | Hendricks et al. .......... 725/132 |
| 6,434,747 B1 | 8/2002 | Khoo et al. |
| 6,446,261 B1 | 9/2002 | Rosser |
| 6,457,010 B1 | 9/2002 | Eldering |
| 6,463,468 B1 | 10/2002 | Buch |
| 6,463,585 B1 | 10/2002 | Hendricks et al. ............ 725/35 |
| 6,477,704 B1 | 11/2002 | Cremia |
| 6,487,538 B1 | 11/2002 | Gupta et al. |
| 6,496,818 B1 | 12/2002 | Ponte |
| 6,505,348 B1 | 1/2003 | Knowles et al. .............. 725/49 |
| 6,507,839 B1 | 1/2003 | Ponte |
| 6,510,417 B1 | 1/2003 | Woods et al. |
| 6,530,082 B1 | 3/2003 | Del Sesto et al. |
| 6,631,360 B1 | 10/2003 | Cook |
| 6,714,992 B1 | 3/2004 | Kanojia et al. |
| 6,718,551 B1 | 4/2004 | Swix et al. |
| 6,845,396 B1 | 1/2005 | Kanojia et al. |
| 6,850,988 B1 | 2/2005 | Reed |
| 2002/0032906 A1 | 3/2002 | Grossman |
| 2002/0035600 A1 | 3/2002 | Ullman et al. |
| 2002/0092019 A1 | 7/2002 | Dwight |
| 2002/0123928 A1 | 9/2002 | Eldering et al. |
| 2002/0143647 A1 | 10/2002 | Headings et al. |
| 2002/0199197 A1 | 12/2002 | Winter |
| 2003/0067554 A1 | 4/2003 | Klarfield |
| 2003/0110497 A1 | 6/2003 | Yassin et al. |

FOREIGN PATENT DOCUMENTS

| | | |
|---|---|---|
| EP | 1162840 A2 | 12/2001 |
| WO | WO 99 04561 A | 1/1999 |
| WO | WO 99 45702 A | 9/1999 |
| WO | WO 99 52285 A | 10/1999 |

OTHER PUBLICATIONS

U.S. Appl. No. 10/017,111, filed Dec. 14, 2001, Matz.
U.S. Appl. No. 10/017,630, filed Dec. 14, 2001, Swix.
U.S. Appl. No. 10/017,640, filed Dec. 14, 2001, Matz.
U.S. Appl. No. 10/017,742, filed Dec. 14, 2001, Matz.
U.S. Appl. No. 10/036,677, filed Dec. 21, 2001, Swix.
U.S. Appl. No. 10/735,309, filed Dec. 12, 2001, Gray.
U.S. Appl. No. 10/037,005, filed Dec. 21, 2001, Matz.
U.S. Appl. No. 10/778,345, filed Feb. 17, 2004, Swix.
U.S. Appl. No. 10/735,346, filed Dec. 12, 2003, Gray.
U.S. Appl. No. 10/036,923, filed Dec. 21, 2001, Matz.
PCT Publication No. WO 94/17609 (Kiefl et al., Aug. 4, 1994).
Cauley, Leslie, "Microsoft, Baby Bell Form Video Alliance," *The Wall Street Journal*, Sep. 26, 1994.
"allNetDevices:—Report: Interactive TV Soon to Become Direct Marketing Tool," allNetDevices, www.devices.internet.com/com_cgi/print/print.cgi?url= http://devices . . . / report_interactive.html, (Nov. 16, 2001) pp. 1-2.
"Liberate Technologies—Solutions," Digital Cable Two-Way, www.solutions.liberate.com/architecture/dc2.html, (Nov. 16, 2001) p. 1 of 1.
"Liberate Technologies—Solutions," Digital Broadband Telco, www.solutions.liberate.com/architecture/db.html, (Nov. 16, 2001) p. 1 of 1.
"Liberate Technologies—Solutions," Liberate Connect Suite, www.solutions.liberate.com/products/connect_suite.html, (Nov. 16, 2001) pp. 1-2.
"Liberate Technologies—Solutions," Liberate imprint Server ™ www.solutions.liberate.com/products/imprint_server.html, (Nov. 16, 2001) p. 1 of 1.
"Liberate Technologies—Solutions," Liberate Mediacast Server™ www.solutions.liberate.com/products/mediacast_server.html, (Nov. 16, 2001) pp. 1-2.
"Spike High Performance Server Array," Mixed Signals Technologies, Inc., www.mixedsignals.com, itvinfo@mixedsignals.com (2000) p. 1.
"Power, flexibility, and control," RespondTV, www.respondtv.com/whyrespond.html (Nov. 16, 2001) pp. 1-2.
"It just clicks!," RespondTV, www.respondtv.com/inaction.html, (Nov. 16, 2001) pp. 1-2.
"The Wink System," Wink System Diagram, www.wink.com/connects/tech_diagram.html, (Nov. 16, 2001) p. 1 of 1.

"What is Wink?," www.wink.com/contents/whatiswink.html, (Nov. 16, 2001) p. 1 of 1.

"How Wink Works," What is Wink: How wink works, www.wink.com/contents/howitworks.html, (Nov. 16, 2001) p. 1 of 1.

"What is Wink: Examples," What is Wink—Examples, www.wink.com/contents/examples.html, (Nov. 16, 2001) pp. 1-2.

"Nielsen Media Research—Who We Are & What We Do," www.nielsenmedia.com/whoweare.html, (Oct. 11, 2001) pp. 1-4.

www.actv.com, Screen Print, Oct. 8, 2000, 5 pages.

"ACTV, Inc. Offers Exclusive Preview of 'Individualized Television' at Official All-Star Café," Business Wire, Sept. 16, 1998, 4 pages.

"ACTV's HyperTV & 'Individualized Television' to be Powered by Sun Microsystems' JavaTV Technology," Bussiness Wire, Apr. 21, 1999, 4 pages.

Whitaker, Jerry, "Interactive TV: Killer Ap or Technical Curiosity?", Broadcast Engineering, Dec. 1999, 3 pages.

Dickson, Glen, "Digital TV gets specifically directed," Broadcasting & Cable, Jun. 5, 2000, 6 pages.

Reed, David, "The future is digital," Precision Marketing, v. 13, n.51, p. 27, Sept. 21, 2001, 4 pages.

Cauley, Leslie, "Microsoft, Baby Bell Form Video Alliance," *The Wall Street Journal*, Sep. 26, 1994.

"Liberate Technologies—Solutions," Liberate Imprint Server ™ www.solutions.liberate.com/products/imprint_server.html, (Nov. 16, 2001) p. 1 of 1.

"The Wink System," Wink System Diagram, www.wink.com/connects/tech_diagram.shtml, (Nov. 16, 2001) p. 1 of 1.

"What is Wink?," www.wink.com/contents/whatiswink.shtml, (Nov. 16, 2001) p. 1 of 1.

"How Wink Works," What is Wink: How wink works, www.wink.com/contents./howitworks.shtml, (Nov. 16, 2001) p. 1 of 1.

"What is Wink: Examples," What is Wink—Examples, www.wink.com/contents/examples.shtml, (Nov. 16, 2001) pp. 1-2.

* cited by examiner

SYSTEM AND METHOD FOR CUSTOMIZING CONTENT-ACCESS LISTS

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

CROSS-REFERENCE TO RELATED APPLICATION

This application relates to U.S. application Ser. No. 09/496,825, filed Feb. 1, 2000, incorporated herein by reference. This application also relates to U.S. application Ser. No. 10/017,742, filed Dec. 14, 2001, entitled "System and Method for Utilizing Television Viewing Patterns," which is incorporated herein by reference. This application also relates to U.S. application Ser. No. 10/017,640, filed Dec. 14, 2001, entitled "System and Method for Identifying Desirable Subscribers," which is incorporated herein by reference.

FIELD OF THE INVENTION

The present invention generally relates to the utilization of content-access patterns. The present invention more particularly relates to the customization of content access systems and methods based on content-access patterns and associated behaviors.

BACKGROUND

Individuals receive information and entertainment content from a wide variety of media sources. These sources include radio, newspapers, the Internet, and television content providers. To support the creation and distribution of content, providers must derive revenue from the content. Content providers derive substantial revenues from subscription and advertising. During the broadcast of a television program, advertisements, in the form of commercials, are inserted at various time intervals. An advertiser pays the broadcaster to include an advertisement with specific content or types of content.

The amount of money that an advertiser pays is directly related to the number of subscribers watching or accessing a broadcast. Conventionally, for television advertising, advertising revenue equals a rate per thousand viewers multiplied by the number of viewers estimated to be viewing a program. Similarly, web site content providers conventionally charge advertisers a fixed amount per thousand advertising impressions. Therefore, the higher the number of viewers or subscribers accessing content, the greater the revenue provider derives. And the greater the number of subscribers, the more likely it is that a greater number of the subscribers will view a particular advertisement. Therefore, content providers desire to increase the number of subscribers they serve.

Many variables affect the number of subscribers who subscribe to a content provider's service. For example, if a cable television provider is able to offer channels that other competitive providers in the viewing area do not offer, the provider is likely to draw subscribers away from the competitors. Also, if a provider's services are easier to use or include more features or more useful features than the competition, the provider may be able to draw competitors' subscribers. Therefore, providers strive to provide a plurality of services that are attractive to subscribers, especially when compared to the services of the provider's competitors.

One such service is an electronic program guide (EPG) or other similar menu system for accessing content. Conventional EPGs for advanced television systems provide access to new content types and services, such as pay per view (generally, in a digital television application referred to as video on demand (VOD) or near video on demand (NVOD)), movies, games, news reports, as well as product purchases for books and other items.

The EPG is, generally speaking, an electronic multi-level menu, which first presents a list of broad categories from which a subscriber can select. As the subscriber selects from among these broad categories, the EPG presents more discrete categories. The EPG may present categories in various ways using various methods. For example, providers conventionally sort the category lists alphabetically or based on the general popularity of specific categories. Under these approaches, all subscribers receive the same menu in the same order, regardless of their personal preferences.

The lack of customization has been due in part to a lack of technology for accurately tracking a subscriber's preferences. Although methods exist for tracking the historic preferences of small numbers of subscribers, no efficient method exists for accurately tracking a large number of subscribers in real near real time. The lack of customization also stems from the expense and difficulty of customizing individual subscriber's EPGs.

Several conventional approaches allow a subscriber to customize a menu or EPG. The conventional approaches are primarily manual processes on the part of the user to set up an automated or semi-automated update process. A set-top box or other menu presentation device then implements the update of the EPG based on the user settings.

For example, the patent to Peter D. Halenbeck, U.S. Pat. No. 5,038,211, discloses a method and apparatus for displaying only menu options meeting selection criteria set by user. The patent to Theodore S. Rzeszewski, U.S. Pat. No. 5,917,481 discloses a set-top box, which includes a feature to add "select" channels, wherein the user manually configures a plurality of channels, and only those channels appear in the EPG.

A similar approach is used by a TiVo® system, which allows a user to select a category, actors, and other preferences for recording television programming. TiVo can also perform a predictive interest algorithm to record programs you might wish to view based on previous viewing. (TiVo® is a registered trademark of TiVo Inc., Alviso, Calif.). As with other conventional methods, TiVo® requires manual configuration by a user before recording can take place.

Conventional approaches for displaying option lists are simplistic and generic, and fail to attract subscriber and do not allow providers to differentiate themselves from one another. Also, because of the shear volume of content available in any given media, conventional systems and methods generate options lists that are difficult for a subscriber to navigate efficiently. Also, conventional systems and methods require the user to make conscious, deliberate decisions and selections in order to find the product offerings or content that meets their desired interests. Because the conventional process requires that a series of manual steps be followed for any level of customization, the process is more complex than is necessary.

In addition, it is slow and inefficient to update the content availability in current content option lists, and therefore, it is difficult to present a customized list even after the subscriber has performed manual configuration. Conventional systems and methods also fail to take advantage of known content viewing patterns and related behaviors in order to provide alternative or additional product offering lists that may be pre-sorted based on the viewing patterns.

SUMMARY

The present invention provides systems and methods for customizing the presentation of a content-access list based on subscriber-specific information, such as historic viewing preferences and related information. Embodiments of the present invention include a content-access-history database, a content database, and an option list creator, which combines data in the content-access-history and content databases to create lists of content-access options that are customized for individual subscribers.

In an embodiment of the present invention, the content-access-history database includes information about actions the subscriber has taken to access content, such as television programming or information on web sites. The content-access-history database may be a clickstream database. The content-access-history database may include a category attribute. In an embodiment, the content-access-history includes television-viewing-history database. For example, the content-access-history database may indicate that at 8:00 p.m. on January 1, the subscriber's television was tuned to channel 12.

The content database in an embodiment of the present invention describes content available from various content providers via various mediums. In one embodiment, the content database includes a television programming history database. The content and content-access-history database are combined to provide a complete history of the content accessed by a subscriber. In the example above, if the provider of content on channel 12 broadcasts or otherwise provides a basketball game at 8:00 p.m. on January 1, then it can be determined that the subscriber was watching a basketball game on that date and at that time. The content-access-history and content databases include various key data fields to link the data, including, for example, the data and time and medium (e.g., channel number).

The combined data forms a content preference profile (CPP) for a subscriber and is useful for a variety of applications. In an embodiment of the present invention, an option list creator software application utilizes the CPP to create options lists, which are customized to a subscriber's viewing preferences. The option list creator may be an application executing on a set-top box in a subscriber's home or may be an application executing on a processor in a content provider facility, such as a cable television operator's head-end facility.

The option list provides a means for a subscriber to access further option lists or to access content. For example, in one embodiment of the present invention, the option list creator creates a menu, such as an electronic program guide. Content available via a specific option varies depending on the medium that the subscriber is using to access the content. For example, if the subscriber is using an EPG presented by a set-top box connected to a television, then the content may comprise at least one of a cable television station, a video-on-demand server, and a personal video recorder.

In an embodiment of the present invention, the option list creator customizes the option list for a subscriber. For example, the options displayed by an EPG are conventionally sorted alphabetically. By utilizing the subscriber's content preference profile, the EPG creator application sorts the options so that the options that are most likely to appeal to the subscriber appear at the top of the list.

An embodiment of the present invention provides numerous advantages when compared to conventional methods for providing customized options lists. By providing a simpler, more accurate option list, a content provider is likely to attract additional subscribers. Also, various content providers operating in the same medium, such as cable operators and satellite television providers, strive to differentiate their offerings to attract subscribers. An embodiment of the present invention offers these providers a mechanism for differentiation.

Moreover, as the deployment of digital television inexorably increases content choices to hundreds or thousands of individually available content selections, such pre-filtering or sorting becomes important in order for the viewer to have the ability to easily and efficiently manage the volume of choices available. By sorting the content option lists so that access to preferred content appears first, an embodiment of the present invention simplifies the process of accessing content for the subscriber. The subscriber is spared from having to wade through less desirable or undesirable content. Therefore, the likelihood that the viewer will find the content he is interested in is increased along with the subscriber's overall satisfaction.

Customization of the option list in an embodiment of the present invention is also much simpler than for conventional systems. Conventional systems require that the subscriber manually configure a set-top box or provide viewing preferences before an EPG will filter or sort content option lists for a subscriber. In an embodiment of the present invention, the content preferences are compiled automatically and then applied to the creation process for the option list, simplifying the process for the subscriber while, at the same time, providing a more accurate representation of the subscriber's current content preferences.

Further details and advantages of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for creating a customized content option list using preferences derived from a content-access-history database. One embodiment of the present invention includes a video-on-demand menu item generator linked to a subscriber content preference profile evaluator. The evaluator retrieves preferences from the preference profile and uses the preferences to filter or sort the menu items generated by the menu item generator. A menu presenter presents the filtered or sorted menu items as an option list to the subscriber.

Figure 1:
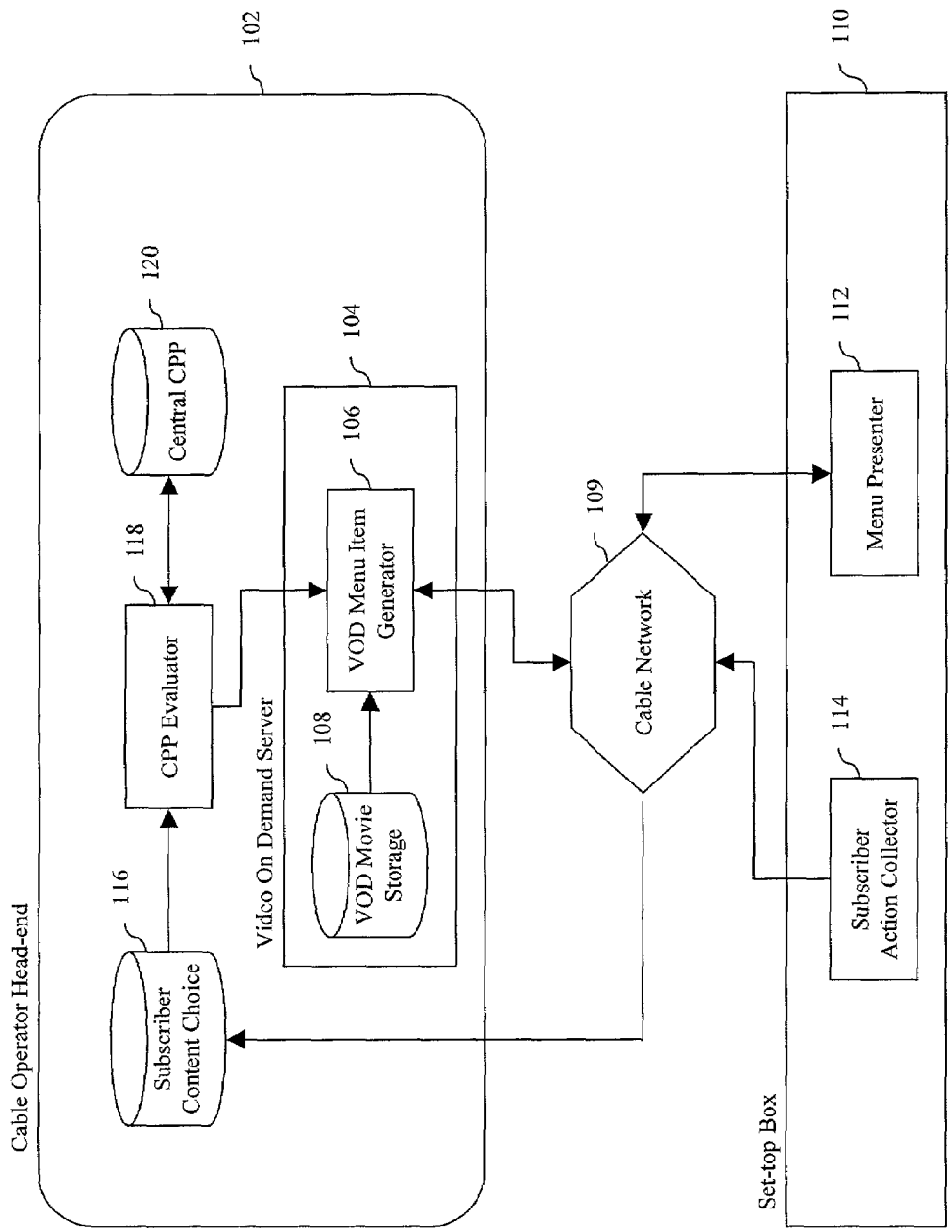
FIG. 1 is a block diagram of an exemplary embodiment and an exemplary environment for centralized operation of an embodiment of the present invention.

FIG. 1 is a block diagram illustrating centralized storage and evaluation of the content preference profile. In the embodiment shown, a cable operator head-end facility 102 includes a video-on-demand (VOD) server 104. The VOD server 104 includes a menu item generator 106 linked to a movie storage database 108. The menu item generator 106 is operative to generate a menu or list of options from which a subscriber can select various content, such as video-on-demand. The menu item generator 106 also receives and responds to commands related to menu presentation. The movie storage database 108 provides content, which can be delivered to a subscriber. In other embodiments, the cable operator head-end includes various other sources of content, including television-programming servers, local advertising servers, e-commerce merchandising servers, and a satellite signal receiver. In the embodiment shown in FIG. 1, the VOD server 104 is linked to a cable network 109, which is in turn linked to a set-top box 110 in a subscriber's home (not shown).

The set-top box 110 includes various software applications, including a menu presenter 112 and a subscriber action collector 114. The menu presenter 112 receives information from the menu item generator 109 via the cable network 109, and presents a menu on a video display device (not shown), such as a television or personal computer. The menu presenter also receives commands and forwards them to the menu item generator 106 as necessary. In one embodiment, the menu presenter 112 provides an electronic program guide (EPG) that includes the generated option list. In another embodiment, the menu presenter 112 provides a multi-level menu, wherein selecting an option from the option list results in the display of another option list. In yet another embodiment, the menu provider presents a simple display of the option list within a picture-in-a-picture (PIP) window on the television display. The option list provides access to various types of content, such as cable television stations, video-on-demand or near video-on-demand, and output from personal video recorders.

The subscriber action collector 114 records actions taken by the subscriber when viewing a program. The subscriber action collector 114 may include a clickstream database. A clickstream database is common in Internet monitoring applications and similar databases have been described for tracking television subscriber actions, as described in a patent application by Meadows et al., U.S. application Ser. No. 09/496825, filed Feb. 1, 2000, which is incorporated herein by reference. The clickstream database tracks individual subscriber actions, such as clicking a hyperlink on a web page or pushing a button on a television remote control.

The subscriber action collector 114 transmits subscriber actions via the cable network 109 to a subscriber content choice database 116. The subscriber actions are combined in the content choice database 116 with local and national programming and advertising data. The resultant data details the programming and advertising displayed on the subscriber's video display and over a period of time, provides a content-access-choice history for each subscriber. A system and method of the present invention may be advantageously implemented with the systems and methods disclosed in a patent application filed by Matz et al. on Dec. 14, 2001, entitled, "System and Method for Utilizing Television Viewing Patterns" Ser. No. 10/017,742, which is incorporated herein by reference.

The content choice database 116 may include a category attribute. The category attribute provides data that the CPP evaluator 118 can use to more accurately generate a profile for a subscriber. For example, in one embodiment of the present invention, the subscriber content choice database 116 includes a television viewing history. The viewing history includes a genre attribute, which can be used to categorize each show. The genre attribute may include, for example, "Sports," "Science Fiction," and "Drama."

Once subscriber choices have been stored in the subscriber content choice database 116, a content preference profile (CPP) evaluator 118 analyzes data for each subscriber to generate an individual CPP and store the CPP in the central CPP database 120.

In other embodiments of the present invention, the CPP database 120 includes additional information, such as the subscriber's purchase history and demographic measures describing the purchaser. A system and method of the present invention may be advantageously implemented with the systems and methods disclosed in a patent application filed by Matz et al. on Dec. 14, 2001, entitled, "System and Method for Developing Tailored Content" Ser. No. 10/017630, which is incorporated herein by reference. For example, in embodiments of the present invention, the CPP database 120 includes a credit card purchase history. The purchase history may include purchases of the content provider's products and/or services and may include purchases of products and/or services, which are complementary to or competitive with the content provider's products and/or services. In another embodiment, the CPP database 120 includes a property-ownership database. In yet another embodiment, the CPP database 120 includes a survey result or questionnaire response database. The subscriber demographics, purchase history, or other additional information may be used in conjunction with the content-access-history to generate a customized content-access list.

Figure 2:
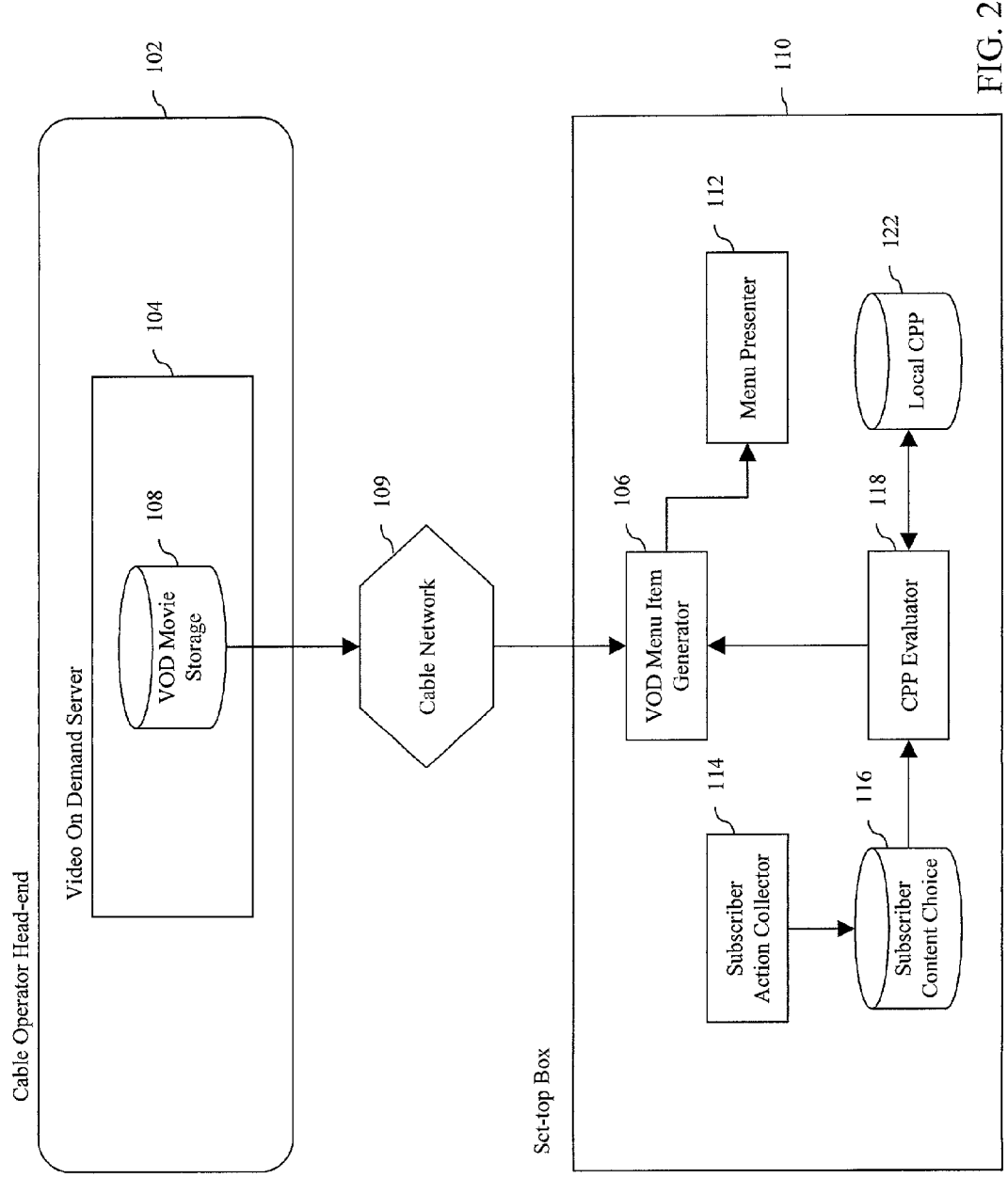
FIG. 2 is a block diagram of an exemplary embodiment and an exemplary environment for decentralized operation of an embodiment of the present invention.

The central CPP database 120 includes profiles for a plurality of subscriber accessing the cable operator head-end 102. To ensure a high level of privacy and security, an individual subscriber may desire that her content choices and general profile be stored locally and not be transmitted to a central facility, such as the cable operator head-end shown in FIG. 1. FIG. 2 is a block diagram illustrating a decentralized or distributed system in an embodiment of the present invention. In the embodiment shown in FIG. 2, the cable operator head-end 102 includes only the VOD server 104 and movie storage database 108. The VOD menu item generator 106, subscriber content choice database 116, CPP evaluator 118 and local CPP profile database 122 execute within the set-top box. Although FIG. 2 illustrates these application components executing on the set-top box 110, the components may also execute on various other types of equipment and may also execute on separate pieces of equipment. For example, in one embodiment, the components are included in a video display system. In another embodiment, the video display system includes the subscriber action collector 116, but all menu creation and content delivery components execute on the set-top box 110.

In another embodiment of the present invention, to help to ensure the privacy of the subscriber, personally identifying information is omitted. The subscriber is assigned a unique identifier, which is stored in the various databases in lieu of the identifying information.

Although the examples above refer to a cable television service provider, any content provider, including, for example, broadcast companies, satellite television providers, and Internet media providers may successfully implement an embodiment of the present invention. Content available in various embodiment, may include both video and audio content, multimedia games, news sources, Internet sites, such as e-commerce sites, and any other content type of interest to a subscriber.

In conventional EPGs and other menu systems, content is arranged using general rules of organization. For example, in some conventional guides, the options, including content types and content titles, appear alphabetically. In other guides, the options appear based on the popularity of the option with a general population. In an embodiment of the present invention, the options appear in an order based on the subscriber's preferences, which are derived from the subscriber's content-access history and other subscriber-specific information.

Figure 3:
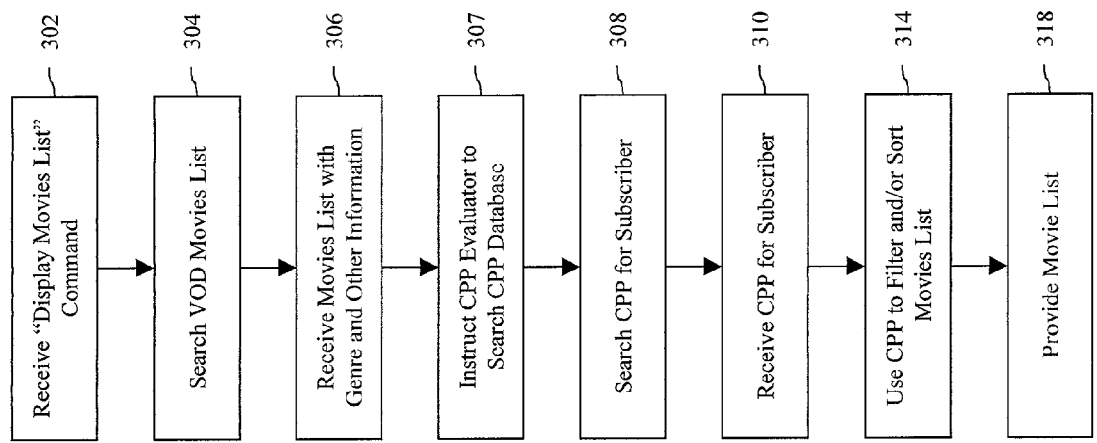
FIG. 3 is a flowchart illustrating a process implemented by a video on demand menu item generator in an embodiment of the present invention.

FIG. 3 is a flowchart, illustrating such a process as performed by the VOD menu item generator (106) and CPP evaluator (118) shown in FIG. 1 in an embodiment of the present invention. The process begins when the menu item generator (106) receives a "Display Movies List" command 302. The command may be generated as a result of a subscriber action or as an automated response to a pre-defined event, such as when the set-top box (110) is turned on. In response to the command, the menu item generator (106) searches the VOD movie storage database (108) for movies 304. The database (108) executes a query and returns the movie list, including the movie genre and other information, to the VOD menu item creator (106). The menu item creator (106) next instructs the CPP evaluator (118) to search the CPP database (120 or 122) for the CPP corresponding to the specific subscriber requesting the movie list 307.

The CPP evaluator (118) searches the CPP database (120 or 122) 308. In response, the database (120 or 122) returns the CPP for the subscriber, to the CPP evaluator (118) 310. The CPP evaluator (118) provides the profile to the menu item generator (106), which uses the CPP to filter or sort the movie list 312. If menu item generator (106) filters the data, only items corresponding to the subscriber's preferences are displayed. If the menu item generator (106) sorts, but does not filter, the data, preferred items appear at the beginning of the list, and non-preferred items appear at the end.

For example, in one embodiment of the present invention, if, according to the CPP, the subscriber watches only sports and science fiction programs, then the menu item generator (106) generates a list including only sports and science fiction programming. In another embodiment, the menu item generator (106) generates a list including all movie types. The sports and science fiction programs appear at the top, and non-relevant categories or options are presented at the bottom. The menu item generator (106) provides the final list to the menu presenter (112) via the cable network (109) 314.

The subscriber content choice database 116 includes the content-access-history of one or more subscribers. The database 116 may include a preference rating, denoting the importance of a particular preference to the subscriber. In one embodiment of the present invention, the CPP evaluator (118) calculates the preference rating by analyzing historical subscriber actions. For example, over a period of several months, a subscriber may demonstrate a preference for live sports. If the subscriber also demonstrates a preference for sports reruns, then the relative weight of sports as a preference would rank above the preference for live television. One embodiment of the present invention uses the preference rating to further sort the option list.

In an embodiment of the present invention, the subscriber merely watches the television or other video display and makes selections from the electronic program guide (EPG). As he makes choices, these choices are recorded and used to create the CPP. In one embodiment, the subscriber turns the filtering or sorting of the EPG on and off as desired. In another embodiment, the subscriber fills out a form, electronic or paper, detailing her preferences. This form is used to initialize the CPP database (120 or 122) so that the users preferences may be used to filter or sort the EPG even though little or no subscriber actions have been recorded. In yet another embodiment, the subscriber sets a parameter, instructing the CPP evaluator 118 to use only a specified time period within the CPP database (120 or 122). For example, a subscriber who is a sports fan may not wish her preferences for football to carry into the spring and summer. He may prefer that the preferences used during spring and summer be derived from viewing patterns occurring after January.

Figure 4:
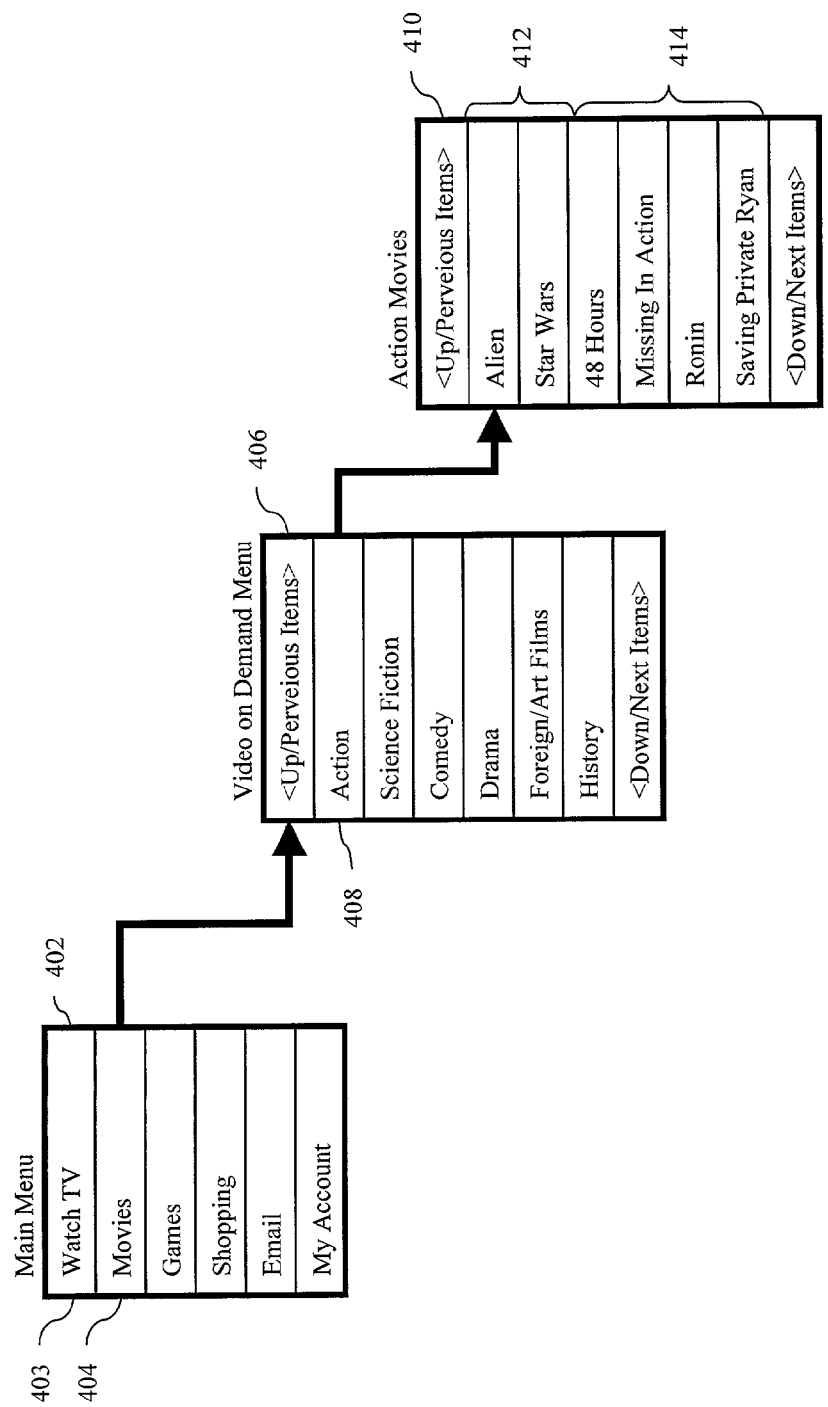
FIG. 4 illustrates a hierarchy of menus generated in an embodiment of the present invention.

FIG. 4 is an illustration of a multi-level menu in an embodiment of the present invention. The menu item generator (106) shown in FIGS. 1 and 2 creates each of the menus using the process illustrated in FIG. 3. The menu item generator (106) initially generates the Main Menu 402. The Main Menu 402 includes several options. As illustrated by the order of the options contained in Main Menu 402, the subscriber most prefers to watch television 403. The subscriber's next preference is to watch movies 404. The remaining options are sorted by a predefined sort order, such as alphabetically.

In the embodiment shown, when the subscriber selects the Movies option 404, the menu item generator (106) creates the Video on Demand Menu 406. As with the Main Menu 402, options in the Video on Demand Menu 406 appear according to the subscriber's preferences. The subscriber prefers movies in the action genre 408. When the subscriber selects the Action option 408 in the Video on Demand Menu, the menu item generator (106) creates the Action Movies option list 410. Each of the movies in the Action Movies list 410 is related to the action genre. The movies may also be related to additional genres, such as comedy and science fiction. The subscriber for whom the Action Movies list 410 was created prefers science fiction after action. Therefore, in the Action Movies list 410, the action movies that are also science fiction movies are displayed first 412. All other action movies are displayed below in alphabetical order 414.

An embodiment of the present invention provides great value to content providers. An embodiment of the present invention assists the provider in attracting subscribers. The content providers may be billed a flat subscription-type rate for provision of the service, or they may purchase the hardware and/or software required for implementing an embodiment of the present invention within their facility or in the homes of their subscribers.

An embodiment of the present invention includes a computer-readable medium, having computer-readable instructions for providing a content option list, including program code for combining data in a subscriber content-access-history database with data from a content database and using the combined data to construct a customized option list. The computer-readable medium may also include program code for sorting the option list, delivering the option list to a television set-top box or other menu presentation device, and displaying the option list.

A computer-readable medium includes an electronic, optical, magnetic, or other storage or transmission device capable of providing a processor, such as the processor in a web server, with computer-readable instructions. Examples of such media include, but are not limited to, a floppy disk, CD-ROM, magnetic disk, memory chip, or any other medium from which a computer processor can read. Also, various other forms of computer-readable media may transmit or carry instructions to a computer, including a router, private or public network, or other transmission device or channel.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method for providing a content option list, comprising:
   receiving a preference for a subscriber from a content-access-history database;
   searching a content database for content related to said preference;
   searching said content database for content unrelated to said preference;
   receiving a first option list from said content database, wherein said first option list comprises an option;
   receiving a non-preference-related option from said content database;
   adding said non-preference-related option to said option list; and
   delivering said first option list to said subscriber.

2. The method of claim 1, further comprising sorting said first option list based on said preference.

3. The method of claim 1, further comprising sorting said first option list by a preference rating attribute.

4. The method of claim 1, wherein said content-access-history database comprises a category attribute.

5. The method of claim 4, further comprising sorting said first option list by said category attribute.

6. The method of claim 1, wherein said content-access-history database comprises a television-viewing-history database.

7. The method of claim 1, wherein said content database comprises a television-programming database.

8. The method of claim 1, wherein said first option list comprises a multi-level menu.

9. The method of claim 1, wherein said first option list comprises an electronic program guide.

10. The method of claim 1, wherein said first option list comprises an image displayed on a television screen.

11. The method of claim 1, wherein said option provides access to a second option list.

12. The method of claim 1, wherein said option provides access to a content source.

13. The method of claim 1, wherein said delivering comprises sending said first option list to a television set-top box.

14. The method of claim 1, wherein said delivering comprises displaying said first option list.

15. A computer-readable medium on which is encoded computer-readable instructions for providing a content option list comprising:
   program code for receiving a preference for a subscriber from a content-access-history database;
   program code for searching a content database for content related to said preference;
   program code for searching said content database for content unrelated to said preference;
   program code for receiving a first option list from said content database, wherein said first option list comprises an option;
   program code for receiving a non-preference-related option from said content database;
   program code for adding said non-preference-related option to said option list; and
   program code for delivering said first option list to said subscriber.

16. The computer-readable medium of claim 15, further comprising program code for sorting said first option list by a said preference rating attribute.

17. The computer-readable medium of claim 15, further comprising program code for sorting said first option list by a category attribute.

18. The computer-readable medium of claim 15, wherein said program code for delivering comprises program code for sending said first option list to a television set-top box.

19. The computer-readable medium of claim 15, wherein said program code for delivering comprises program code for displaying said first option list.

20. The computer-readable medium of claim 15, further comprising program code for sorting said first option list based on a preference.

* * * * *